United States Patent [19]

Sood et al.

[11] Patent Number: 5,146,607
[45] Date of Patent: Sep. 8, 1992

[54] METHOD AND APPARATUS FOR SHARING INFORMATION BETWEEN A PLURALITY OF PROCESSING UNITS

[75] Inventors: Paardeep K. Sood, Plantation; Roger A. Smith, Sunrise; Timothy J. Heeter, Ft. Lauderdale; Adriano Roganti, Margate; John D. Acton, Ft. Lauderdale, all of Fla.

[73] Assignee: Encore Computer Corporation, Marlborough, Mass.

[21] Appl. No.: 758,726

[22] Filed: Sep. 9, 1991

Related U.S. Application Data

[63] Continuation of Ser. No. 403,779, Sep. 8, 1989, abandoned, which is a continuation of Ser. No. 880,222, Jun. 30, 1986, abandoned.

[51] Int. Cl.$^5$ ............................................. G06F 15/16
[52] U.S. Cl. .................... 395/800; 364/229.2; 364/931.4
[58] Field of Search ............ 395/800 M.S. File; 364/DIG. I, DIG. II

[56] References Cited

U.S. PATENT DOCUMENTS

| | | | |
|---|---|---|---|
| 3,618,045 | 11/1971 | Campbell | 364/200 |
| 3,735,360 | 5/1973 | Anderson et al. | 364/200 |
| 3,845,474 | 10/1974 | Lange et al. | |
| 3,873,819 | 3/1975 | Greenwald | 371/16 |
| 3,889,237 | 6/1975 | Alferness | 364/200 |
| 4,056,844 | 11/1977 | Izumi | 364/200 |
| 4,345,328 | 8/1982 | White | 371/37.7 |
| 4,351,025 | 9/1982 | Hall | 364/200 |
| 4,394,731 | 7/1983 | Flusche et al. | 364/200 |
| 4,442,487 | 4/1984 | Fletcher et al. | 364/200 |
| 4,509,115 | 4/1985 | Manton | 364/200 |
| 4,527,238 | 7/1985 | Ryan et al. | 364/200 |

FOREIGN PATENT DOCUMENTS 2156554 10/1985 United Kingdom.

Primary Examiner—David Y. Eng
Attorney, Agent, or Firm—Fleit, Jacobson, Cohn, Price, Holman & Stern

[57] ABSTRACT

A plurality of processing units, each having a local memory connected thereto is disclosed. A write sense controller is also connected to each of the processing units to transmit a memory write word into a shared portion of local memory over a reflective memory line. Other write sense controllers receive the memory words from the reflective memory bus and cause them to be written into corresponding storage locations in the shared partitions of their local memories.

7 Claims, 5 Drawing Sheets

METHOD AND APPARATUS FOR SHARING INFORMATION BETWEEN A PLURALITY OF PROCESSING UNITS

This application is a continuation of application Ser. No. 07/403,779 filed Sep. 8, 1989 which is a continuation of application Ser. No. 06/880,222, now abandoned, filed Jun. 30, 1986, now abandoned.

BACKGROUND OF THE INVENTION

The field of the invention relates to multiple processor digital computer systems. More particularly the field of the invention relates to multiple processor digital computer systems having means for sharing substantially identical blocks of information stored within a plurality of local main memory units.

As mainframe computers and minicomputers have continued to develop, the demand for increased processing speed and throughput has continued unabated. It is clear that as each generation of computer design is succeeded by the next, the total processing throughput available from a given system configuration continues to increase greatly.

In many applications for high performance minicomputers and mainframe computers such as real time simulation, geophysical modeling and the like, even the current throughput capacities available from state-of-the-art minicomputers and mainframe computers are insufficient to solve the problems of users of real time simulation systems and geophysical modeling systems within manageable lengths of time.

In the past it has been proposed to connect multiple processor units together in order to obtain increased throughput. However, one of the problems presented by the use of such multiple processor units is that a common primary storage or main memory unit, which is accessible by all processors, has been employed. As a result, as the number of processors increases delays increase due to contention and timing problems by one processor seeking to use input or output through a main memory while another processor is so engaged. This has led to diminishing returns in the use of such systems.

It has also been proposed that a shared memory be subdivided into local memories. However, in that case, it has been impossible to maintain the integrity of the local memories over the wide range of addresses which might be accessed by a particular processor.

What is needed then is a method and apparatus which can allow multiple processors to execute simultaneously various portions of code while rapidly and efficiently sharing information between themselves.

SUMMARY OF THE INVENTION

A multiple processor shared memory system is disclosed herein. A plurality of central processor units has connected thereto respective local buses which are adapted to carry data, address, timing and control signals thereon. A dual port primary storage or memory unit having a first port and a second port has its first port connected to the local bus for exchange of information therewith.

A write sense controller also is connected to the local bus. The write sense controller is adapted to determine when the central processor unit or any other unit connected to the local bus is performing a memory write operation directed to a preselected range of addresses within the memory. The write sense controller retransmits the data through a bidirectional port to a reflective memory bus which is connected to other write sense controllers of the system. The write sense controller is also adapted to receive information through the reflective memory bus from the other write sense controllers in the system and retransmit the information to a read sense controller to which it is connected. Before retransmission to the read sense controller the write sense controller modifies or adds a selected memory address to the received information.

The read sense controller also is connected to the second port of the local memory. When the write sense controller receives information from the reflective memory bus it is transmitted to the read sense controller which receives the modified selected memory address to the information and performs a memory write operation to the modified selected address of the dual port memory through the second port.

A plurality of write sense controllers together with associated central processor units, memories and read sensor controllers may be connected to the reflective memory bus so that each local memory has a first addressing range identified as a shared memory portion and a second addressing range identified as a local memory portion. The shared memory portions have identical contents.

It is a principal object of the present invention to provide a multiple processor data processing system wherein each processor has a single local memory which stores a shared memory segment, identical to shared memory segments in local memory units of other processors.

It is an additional object of the instant invention to provide a multiple processor unit data processing system having a shared memory structure with minimum contention and latency delays.

Other objects and uses of the instant invention will become obvious to one skilled in the art upon a perusal of the specification and claims in light of the accompanying drawings.

DESCRIPTION OF THE PREFERRED EMBODIMENT

Figure 1:
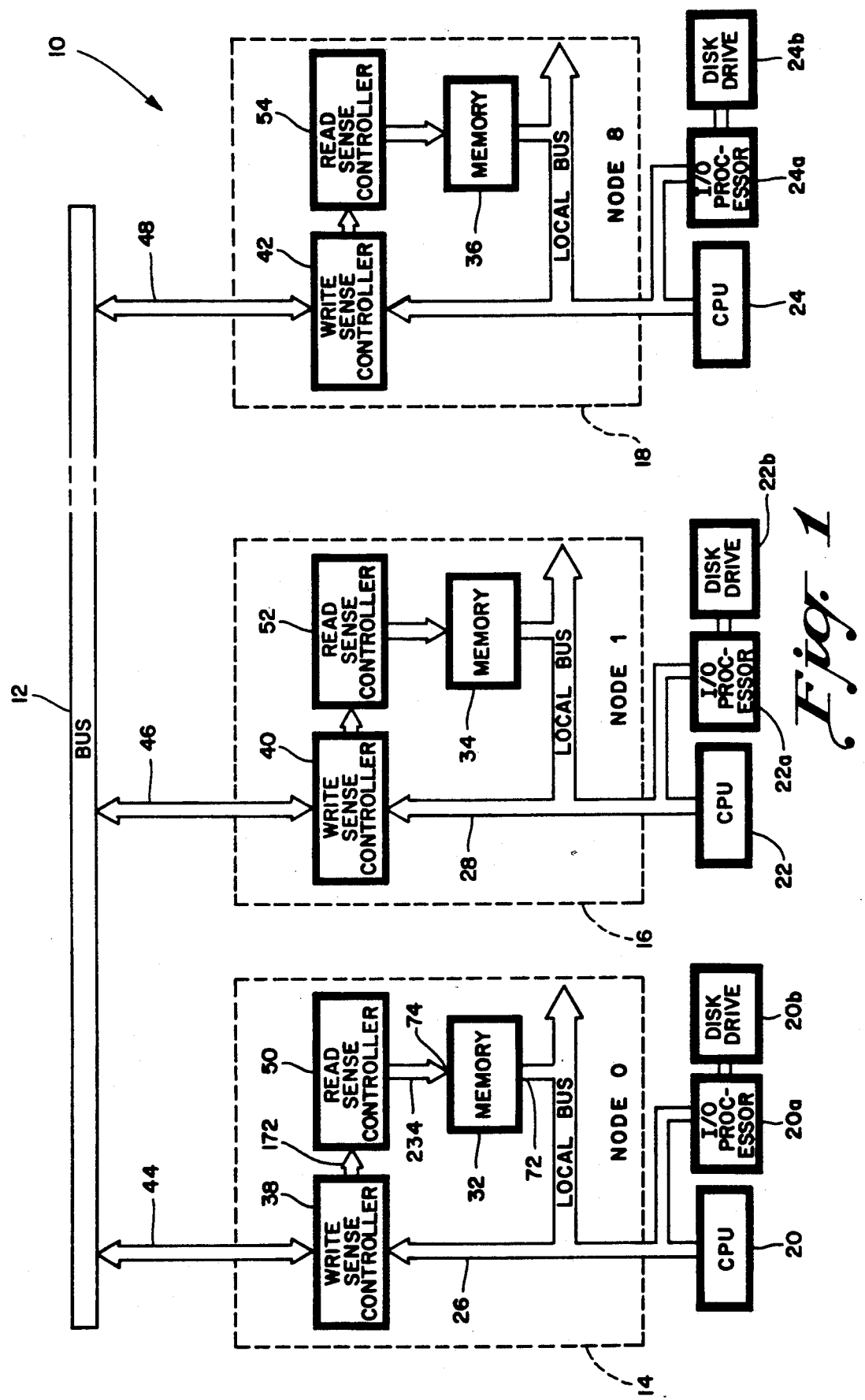
FIG. 1 is a block diagram of a multiple node multiprocessor system embodying the present invention.

Referring now to the drawings, and especially to FIG. 1, a multiprocessor data processing system embodying the present invention and generally identified by numeral 10 is shown therein. The data processing system 10 includes a reflective memory bus 12 having connected thereto a plurality of nodes respectively numbered 14, 16 and 18 in the preferred embodiment. The node 14 includes a central processor unit 20. The node 16 includes a central processor unit 22. The node 18 includes a central processor unit 24. A local bus 26 is connected to the central processor unit 20. An input- /output processor 20a is connected to the local bus 26. A disk drive 20b is connected to the input/output processor 20a. A local bus 28 is connected to the central processor unit 22. An input/output processor 22a is connected to the local bus 28. A disk drive 22b is connected to the input/output processor 22a. A local bus 30 is connected to the central processor unit 24. An input/output processor 24a is connected to the local bus 30. A disk drive 24b is connected to the input/output processor 24a.

A dual port integrated memory module 32 is connected to the local bus 26. A dual port integrated memory module 34 is connected to the local bus 28. A dual port integrated memory module 36 is connected to the local bus 30. the dual port integrated memory modules 32, 34 and 36 are of the type sold by Gould Inc., Computer Systems Division, 6901 West Sunrise Boulevard, Ft. Lauderdale, Florida.

A write sense controller 38 is connected to the local bus 26. A write sense controller 40 is connected to the local bus 28. A write sense controller 42 is connected to the local bus 30. The write sense controller 38 is connected via an interface bus 44 to the reflective memory bus 12. The write sense controller 40 is connected via an interface bus 46 to the reflective memory bus 12 for communication therewith. The write sense controller 42 is connected via an interface bus 48 to the reflective memory bus 12.

A read sense controller 50 is connected between the write sense controller 38 and the dual port integrated memory module 32. A read sense controller 52 is connected between the write sense controller 40 and the dual port integrated memory module 34. A read sense controller 54 is connected between the write sense controller 42 and a dual port integrated memory module 36.

It may be appreciated then that each of the nodes includes a local bus to which a write sense controller is connected in parallel with a dual port memory. A read sense controller is connected between the write sense controller and the dual port memory through a second memory port. Each of the write sense controllers 38.40 and 42 is connected in parallel with the reflective memory bus 12. Each of the nodes 14, 16 and 18 may also include input/output controllers, disc drives, tape drives, printers and the like.

Figure 2:
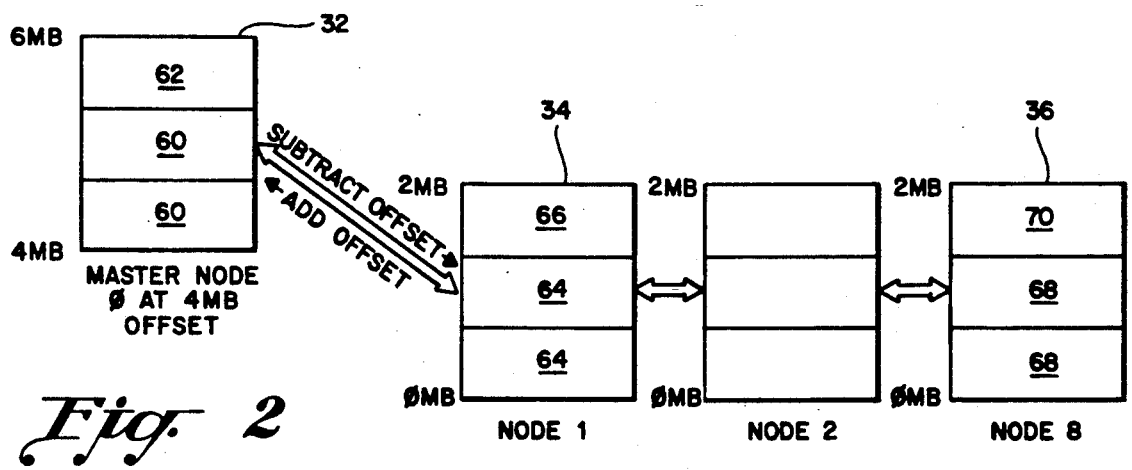
FIG. 2 is a diagram of a memory map of each of the local memories of the multiprocessor system of FIG. 1.

As may best be seen in FIG. 2, the memory units are segmented into shared areas and local areas. In the present embodiment, the memory unit 32 has a shared area 60 and a local area 62. The memory unit 34 has a shared area 64 and a local area 66. The memory unit 36 has a shared area 68 and a local area 70. The shared areas reside in a plurality of memory cells between a first set of addresses in a particular memory unit. The local area resides in a plurality of memory cells having a second address range in a particular memory. Thus, the selection of a particular address within a memory selects whether data is local data or shared data.

In the event that the central processing unit 20 executes a memory write operation on the local bus 26, the memory write operation transfers data to the memory unit 32 through a first port 72 in a conventional fashion. It should be noted that the memory unit 32 also has a second port 74.

At the same time that the memory write operation is taking place on a local bus 26, the identical signals are fed via the local bus 26 to the write sense controller 38.

The write sense controller 38 tests whether the memory write operation is to a memory location within either the shared region or the local region. In the event that the address carried on the local bus 26 is within the range of addresses occupied by the shared region, the write sense controller retransmits the data to be written into the shared region of memory unit 32 on the link 44 and also onto the reflective memory bus 12 where that information is received by the write sense controllers 40 and 42 as will be seen in more detail hereafter.

Figure 4:
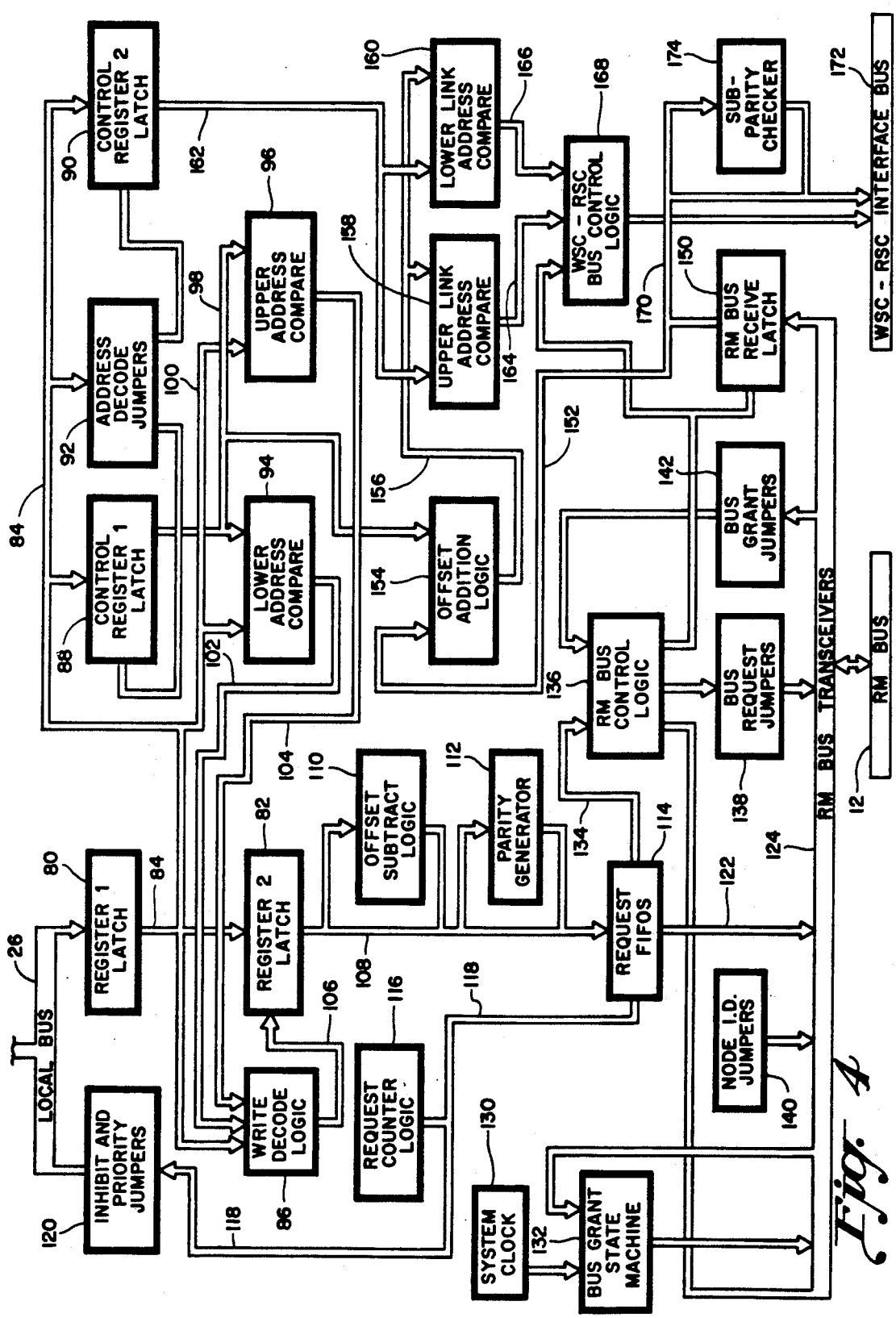
FIG. 4 is a block diagram of a write sense controller of FIG. 1.

Referring now to FIG. 4, details are shown therein of the write sense controller 38, which is identical to the write sense controllers 40 and 42. The local bus 26 is connected to a first register latch 80. The register latch 80 receives the data, address, timing and control signals hereafter called the memory write word from the local bus 26 at the same time as does the port 72 of the memory 32 unit. All of the signals are held within the register latch 80 and fed to a second register latch 82, which is connected via a bus 84 to the register latch 80. At the same time, the register latch 80 provides the timing and control signals via the bus 84 to a write decode logic array 86.

Address signals to a first control register latch 88 and a second control register latch 90 are preloaded by writing to two control register addresses. The addresses of these two control registers are determined by a plurality of address decode jumpers 92. The lower and upper boundaries for the local bus are held in control register latch 88. The lower and upper boundaries for the reflective memory bus 12 are held in control register latch 90.

The output of control register latch 88 is fed to the address comparators 94, 96 over bus 98.

At the same time, the address is fed directly to a lower address comparator 94 and an upper address comparator 96 by an address input bus 100 connected between the comparators 94 and 96 and the bus 84. In the event that the address so supplied to the lower address comparator 94 is not less than the address fed from the control register latch 1 for a lower address limit and not greater than the address fed to the upper address comparator 96, respective true outputs are provided at a pair of leads 102 and 104 which are respectively connected from the lower address comparator 94 and the upper address comparator 96 to the write decode logic 86. The two signals are used to enable the write decode logic 86 which in turn is connected via a lead 106 to the second register latch 82 to enable the second register latch 82 to receive data from the first register latch 80. In other words, the register latch 82 will only be enabled to receive data when the address to which the data is written is within the address bounds stored in the control register latch 1. Those address bounds define the shared area of the local memory 32. The address boundaries by the setting of the address decode jumpers 92 which load the lower and upper addresses for write sense comparator transmission to the reflective memory bus into the first control register 88.

Assuming that the data is to be written into the shared area of the memory, it is then received by the latch 82 and outputted via a bus 108 connected to the latch 82 to an offset subtract logic module 110. The offset subtract logic module subtracts any address offset from the address portion of the memory write word so that a normalized address can be supplied to the reflective memory bus.

The data is then transmitted further by the bus 108 to a parity generator 112 which generates by the parity signals on the transmitted address and data. The data, normalized addressed, control and timing signals are then supplied by the bus 108 to a plurality of request fifo registers 114. Each time a word is transferred to the request fifos 114 from the bus 108, a request counter 116, which is connected by a lead 118, is incremented. In the event that the request counter 116 exceeds a preset count, in the preferred embodiment 56, a signal is supplied to the connector 118 and to certain inhibit and priority jumpers 120 to cause an inhibit signal to be placed on the local bus 26 to prevent further memory write operations from occurring on the local bus 26 in the shared memory range. When the request counter 116 indicates that there are less than 56 words present in the request fifos 114 the local bus 26 is enabled for memory write operation. The words are then transmitted via a bus 122 from the request fifos 114 to a plurality of reflective memory bus transceivers 124. Each time that a word is transmitted from the fifos, the request counter logic 116 is decremented. The words are then transmitted via the bus transceivers 124 to the reflective memory bus 12 for receipt by the other write sense controllers 40 and 42.

In order to ensure that only one write sense controller transmits data during a selected interval, certain bus grant logic is included in the write sense controller 38. A system clock 130 drives a bus grant state machine 132 which is connected to the reflective memory bus transceivers 124. When the request fifos 114 have data to be transmitted, a signal is provided on a bus 134 connected to a reflective memory bus control logic block 136. The reflective memory bus control logic block 136 then actuates a plurality of bus request jumpers 138 connected thereto which generates a bus request signal on the reflective memory bus 12. The particular write sense controller and node requesting bus access are identified by a plurality of node ID jumpers 140 connected to the reflective memory bus transceivers 124. In the present embodiment, node 0 acts as a bus master and nodes 1 through 8 act as slaves, in other words, node 0 will provide bus grant signals to all other nodes or to itself in order to determine which node may transmit on the reflective memory bus.

Assuming that node 0 has performed arbitration, a bus grant signal will be returned over the reflective memory bus 12 through the reflective memory bus transceivers 124 to a plurality of bus grant jumpers 142 connected thereto. The bus grant jumpering logic 142 having received an enable signal, will then cause the reflective memory bus control logic to be enabled thereby enabling the request fifos 114 and transceivers 124 to transmit data address and tag signals over the reflective memory bus to all other nodes.

Thus when the central processor unit 20 performs a local memory write operation into its own memory 32 at its own shared address range, the same memory write is passed through the write sense controller 38 with any address offsetting which must be performed and supplied via the reflective memory bus 12 to all other write sense controllers connected thereto. Therefore, each time a memory location within the shared region of a local memory is updated, the updating information as well as its address is broadcast over the reflective memory bus 12.

The write sense controllers 38, 40 and 42 are also adapted to receive the data transmitted over the reflective memory bus 12. As may best be seen in FIG. 4, that data from the reflective memory bus 12 is supplied through the bus transceivers 124 to a reflective memory bus receive latch 150 connected thereto. The data is held within the latch 150 which is selectively enabled by the reflective memory bus control logic to receive data from the reflective memory bus transceivers except when a particular write sense controller is itself transmitting.

The information word taken from the reflective memory bus 12 is then supplied via a bus 152 to an address offset addition logic module 154 which is connected thereto. Any offsetting address which is necessary is then added to the received address and the address information is fed via a bus 156 to an upper link address comparator 158 and a lower link address comparator 160 for the purpose of determining whether the local shared memory partition encompasses the address so supplied by the addition logic. The local partition is defined by information supplied from the address decode jumpers 92 to the second control register latch 90 which is connected via a bus 162 to the upper link address comparators 158 and the lower link address comparator 160. In most instances, the shared partition will have identical upper and lower address bounds whether the write sense controller is operating in a transmitting or a receive mode. There are instances, however, when different bounds may be desirable to be used. Thus, separate comparator circuitry has been provided to detect when the information received from the reflective memory bus is within the receive shared partition.

In the event that the information is within the address limits of the shared partition, enabling signals are supplied to a pair of leads 164 and 166 which are respectively connected to the upper link address comparator 158 and the lower link address comparator 160 and to a write sense controller-read sense controller bus control logic module 168. That module 168 is enabled to cause the information supplied to a bus 170 by the reflective memory bus receive latch 150 and to the write sense controller and read sense controller interface bus 172 connected thereto to be latched into the read sense controller 50 after having been cleared by a subparity checker 174.

In summary, when a signal from the write sense controller 40 or the write sense controller 42 is supplied to the reflective memory bus 12, the write sense controller 38 has its reflective memory bus receive latch 150 enabled to latch the information therein. The received address is then offset and compared to the delimiting addresses of the shared region. In the event that the received address, as offset, is within the shared region, the information from the latch which is already present on the write sense controller-read sense controller interface bus 172 is latched into the input of the read sense controller 50.

Figure 3:
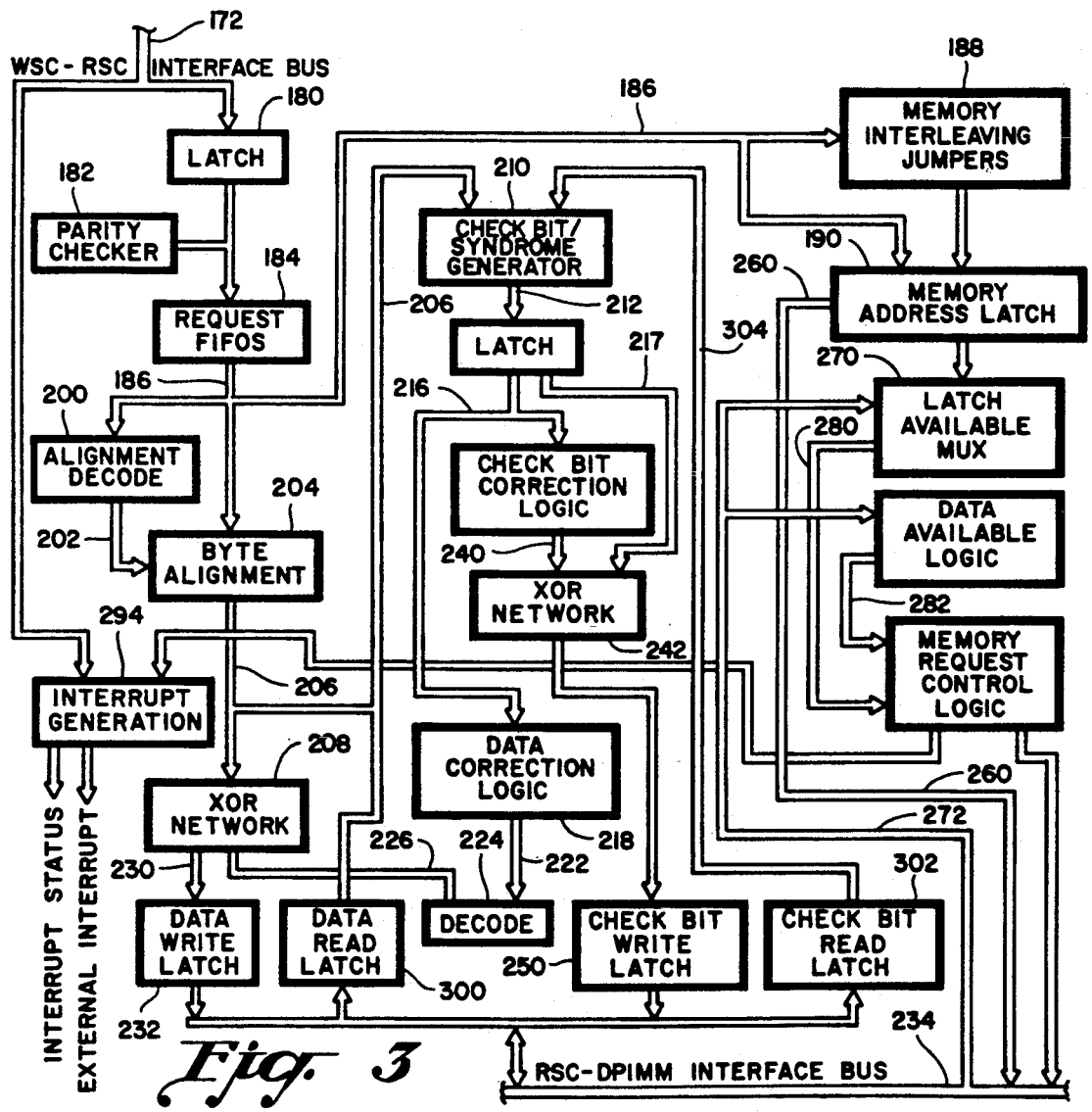
FIG. 3 is a block diagram of a read sense controller of FIG. 1.

Referring now to FIG. 3, the read sense controller 50 is shown in detail therein. The read sense controller 52 and read sense controller 54 are identical thereto. When the write sense controller-read sense controller bus control logic 168 provides its enable signal, the information from the reflective memory bus receive latch 150 is latched into a latch 180 in the read sense controller 50. The input information is checked for parity in a parity checker 182 connected to the latch 180 and if of correct parity is forwarded to a plurality of request fifo registers 184. The request fifo registers 184 have a bus 186 connected thereto which supplies the input information to a plurality of memory interleaving jumpers 188 and to a memory address latch 190.

An alignment decoder 200 is connected to the bus 186 to receive the data portion of the input word to determine whether a full 32 bit data word transmitted, a 16 bit half word or a byte of data has been transmitted. In the event that a full 32 bit word has been transmitted, a signal is generated on an output bus 202 which is received by a byte alignment matrix 204. The byte alignment matrix 204 is also connected to the bus 186 to receive the data therefrom. Since in the current example the data word is 32 bits long, the byte alignment matrix 204 remains inactive and transmits the 32 bit word on a bus 206 to an exclusive OR network 208 connected thereto and to a syndrome generator 210 also connected to the bus 206.

The data word, when transmitted, is accompanied by a number of check bits. The data word is supplied to the syndrome check bit generator 210 which performs arithmetic operations on the data word bits. In the event that an error is detected error indicating bits are supplied to a bus 212 which is connected to a latch 214 and the error bits are held within the latch 214.

If the data is to be corrected, it is supplied by the latch 214 to a bus 216 which is connected thereto. A data correction logic module 218 is connected to the bus 216 as is a check bit correction logic module 220. The data word is corrected in the data correction logic 218 and is supplied by a bus 222 to a decode module 224. The decode module 224 feeds correcting information bits into a bus 226 which is connected to the exclusive OR network 208. The correcting bits on the bus 226 are combined with the data bits in the exclusive OR network 208 to generate a corrected data word whether of 16, 24 or 32 bits in length. The corrected data word is then output by the exclusive OR network 208 to a bus 230. The bus 230 feeds the corrected data word to a data write latch 232 which supplies the corrected data word to a read sense controller-dual port integrated memory module interface bus 234 connected thereto. The read sense controller-dual port integrated memory module interface bus is connected to the memory 32 at the port 74.

Check bits are also supplied to the memory unit 32. In the event that the check bit correction logic 220 is activated by information in the form of check bits received from the latch 214 during the memory read operation, the check bits are fed through a bus 240 to an exclusive OR network 242 which is connected thereto. These bits are ORED together with the check bits as supplied to generate a final corrected check bit group which is output to a bus 246 connected to the exclusive or network 242. The check bits from the bus 246 are supplied to a check bit write latch 250 connected to the bus 246. The check bits are then output on the read sense controller-dual port integrated memory module interface bus 234 to be supplied to the port 74 of the memory unit 32.

In order to cause the memory unit 32 to store the information supplied to it by the read sense controller 50, it is necessary to supply the memory unit 32 with an address of a storage location into which storage is to take place, as well as request and timing signals.

The memory address latch 90 has a first output bus 260 connected thereto which is adapted to carry the address of the storage location of the memory unit 32 to which the word is to be written. The bus 260 transfers the address to the read sense controller dual port integrated memory module interface bus 234 to which it is connected. Before the memory unit 32 can receive the input information it must be interrogated to determine if it is available. Accordingly, the memory address latch 190 is also connected to a latch available multiplexer 270 which is adapted to receive input over an input control bus 272 connected to the read sense controller-dual port integrated memory module interface bus. The input bus 272 is also connected to a data available logic module 274. Both the latch available multiplexer 270 and the data available logic module 274 are connected to memory request control logic 276.

Either the latch available multiplexer 270 must produce an output signal at an output bus 280 which is connected to the memory request control logic 276, thereby indicating that the memory may be written into or the data available logic module 274 must activate an output bus 282 to indicate that information is to be output from the memory unit 32 to the read sense controller 50.

In the event that a memory write operation is to take place, it is necessary to send initially a request to the memory unit 32 interrogating it as to whether it is ready to receive the data to be written therein. The memory request control logic 276 generates such a request signal over a bus 292 connected thereto. At the same time, a signal is asserted on a bus 290 connected to the memory request control logic 276. An interrupt generation module 294 is connected to the bus 290 and when it receives a signal on the bus 290, causes an interrupt to be asserted on the local bus 26. The presence of the interrupt on the local bus 26 prevents any other units connected to the local bus 26 from attempting to write to the memory at the same time.

The memory 32 then generates a write grant signal to the bus 234 which is received by the bus 272 indicating that a memory latch is available to receive information to be written therein.

In the event that the read sense controller 50 receives information in the form of a word having a data field which is less than 32 bits wide, in other words, the data is in the form of a 16 bit half word or an 8 bit byte, the data is fed through the latch 180 parity checker 182 and request fifos 184 as previously stated. The data is then received by the alignment decode logic 200 and the byte alignment logic 204 which senses the presence of the 16 bit half word or the 8 bit byte. Since only a portion of the 32 bit word storage location in memory unit 32 need, be changed, the read sense controller then causes the memory request logic 276 to cause the memory 32 to output the 32 bit word at the address at which the input data is to be stored.

The 32 bit word is received by the read sense controller-dual port integrated memory module interface bus 234 and the data portions are fed to the data read latch 300 which is connected thereto. The check bit portions are fed to the check bit read latch 302 also connected to the bus 234. Both the data and the check bits are then fed to the syndrome generator 210, respectively, by the bus 206 and a bus 304 connected to the check bit read latch and the syndrome generator 210. The input data is merged with the information from the memory in the exclusive OR networks 208 and 243 and then supplied to the data write latch 232 and the check bit write latch 250. After that the updated 32 bit word and accompanying check bits are then stored back into the original location in memory with 8 or 16 bits of the data having been updated together with the associated check bits.

Figure 5:
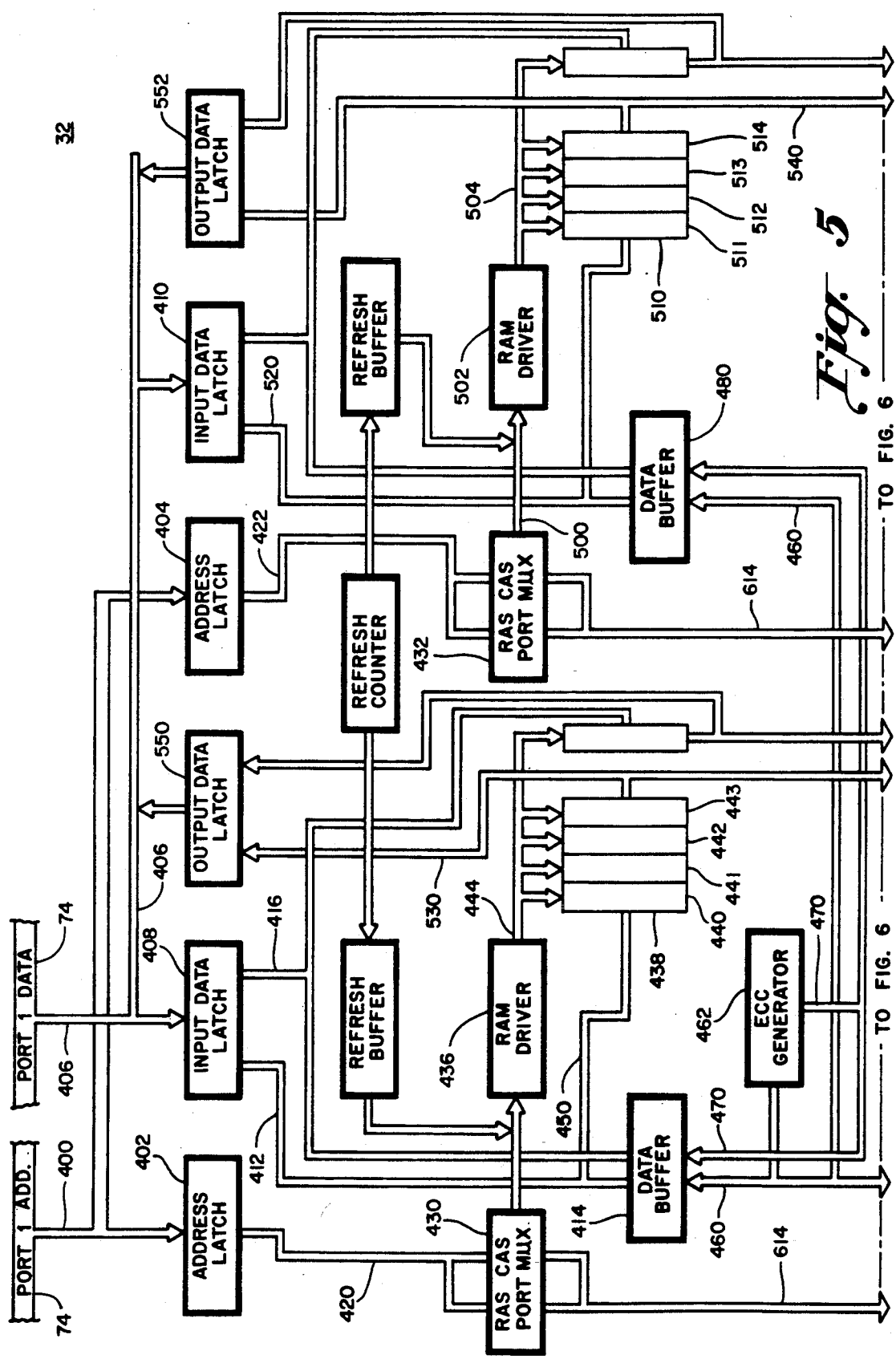
FIG. 5 is a block diagram of a first portion of a dual port memory unit of FIG. 1.
Figure 6:
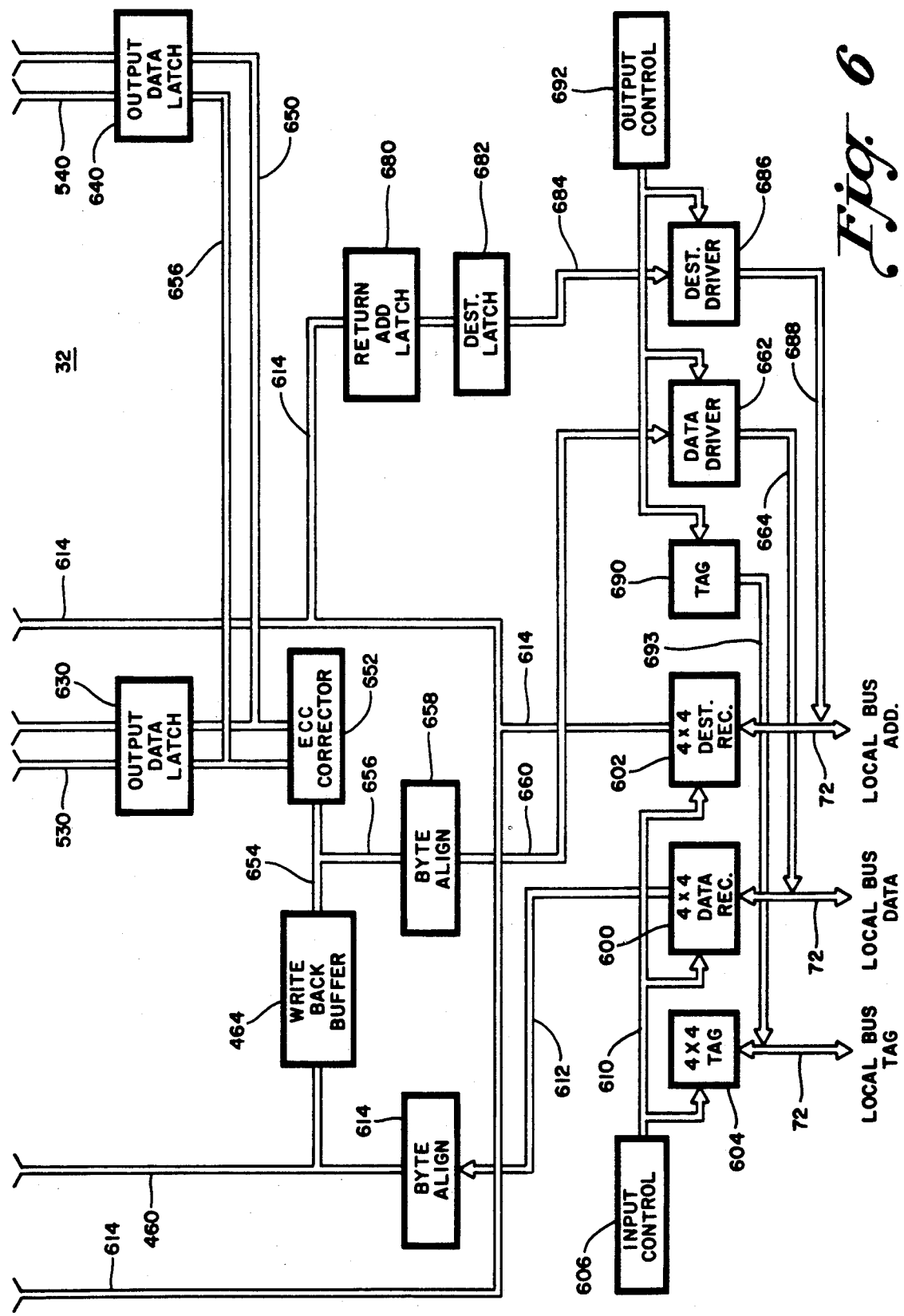
FIG. 6 is a block diagram of a second portion of a dual port memory unit of FIG. 1.

Referring now to FIGS. 5 and 6, details of the memory unit 32 are disclosed therein. In the present embodiment the memory units 32, 34 and 36 are dual port integrated memory modules of the type manufactured and sold by Gould Inc., Computer Systems Division, 6901 West Sunrise Boulevard, Ft. Lauderdale, Florida.

The address and data information from the read sense controller-dual port integrated memory module interface bus 234 are supplied to the port 74 of the memory unit 32. The address field of the input information is supplied to an address bus 400 to which is connected an address latch 402 and an address latch 404. The data word to be written into the memory unit 32 is received from the port 74 through a data bus 406. An input data latch 408 is connected to the data bus 406 as well as an input data latch 410. An output bus 412 is connected to the input data latch 408. A data buffer 414 is connected to the output bus 412. A bus 416 is also connected to the input data latch and to the data buffer 414. In the present embodiment, only full 32 bit word data bits and 7 check bits will be accepted at the port 74.

The address is loaded either into the address latch 402 or 404. The address latches 402 and 404 then supply the stored addresses, respectively, to a bus 420 connected to the address latch 402 or to a bus 422 connected to the address latch 404. A row address strobe, column address strobe port multiplexer 430 is connected to the bus 420 to receive the address therefrom. Likewise a row address strobe, column address strobe port multiplexer 432 is connected to the bus 422 to receive the address therefrom.

The row address strobe, column address strobe port multiplexer 430 and the row address strobe, column address strobe port multiplexer 432 each decode the input addresses received from the address latch. Only one of the multiplexers will be enabled, depending upon the value of the input address. Assuming for the sake of example that the address received by the latch 402 or the latch 404 activates the row address strobe and column address strobe port multiplexer 430, an output addressing signal is generated on an output bus 432 which is supplied to a random access memory driver unit 436 connected thereto. A first memory array 438 consisting of memory slices 440, 441, 442 and 443 which are separately strobable, are connected to be an output bus 444 of the ram driver 436. The memory slices comprise a plurality of separated addressable data storage cells or locations. The ram driver 436 supplies address signals to one of the slices 440 through 443 to select a data storage location to be written into or read from.

Simultaneously, data is held on the bus 412 or in the data buffer 414 and is supplied to a memory data bus 450 connected to the bus 412. The data word present on the bus 450 is written into the address of the storage location supplied by the address bus 444.

In a similar fashion, an output bus 500 is connected to the row address strobe, column address strobe port multiplexer 432. A random access memory driver 502 is connected to the bus 500 to receive signals therefrom. An address bus 504 is connected to the random access memory driver 502 to receive addressing signals therefrom. A random access memory array 510 having a first slice 511, a second slice 512, a third cylinder 513 and a fourth slice 514 is connected to the address bus 504 to receive address selection information therefrom. A data transfer bus 520 is connected to the input data latch 410 and to the data buffer 480. The data transfer bus 520 supplies input data to the memory array 510 in the same way as does the data bus 450.

In the event that it is necessary for the data in either the memory array 438 or the memory array 510 to be written back to the read sense controller that data is written out on either a memory output bus 530 connected to the memory array 438 or a bus 540 connected to the memory array 510. An output data latch 550 is connected to the bus 530 to receive and latch the data therefrom. An output data latch 552 is connected to the output data bus 550 to latch in output data therefrom. Data from the latches 550 and 552 is supplied to the bus 406, transferred to port 74 and to the read sense controller 50.

The dual port integrated memory module 32 also has the local port 72. The local port 72 comprises a data receiver 600 consisting of a plurality of latches connected thereto. A destination or address receiver 602 is connected to the port 72 as is a receiver 604 for receiving tag information. Each of the receiver units 600, 602 and 604 can store up to four memory write words. The receivers 600, 602 and 604 are controlled by an input control unit 606 connected thereto by a control bus 610. Data received by the data receiver 600 is supplied via a bus 612 to a byte alignment array 614. After being processed by the byte alignment array 614 in the event that the data is 8 bits or 16 bits long rather than 32 bits, it is output on the bus 460 to be received by the data buffers 414 and 480 simultaneously for storage either in memory array 438 or 510 depending upon its address.

At the same time the address at which the data is to be stored is supplied by the destination transceiver 602 to an address bus 614. The address bus 614 is connected both to the row address column address strobe port multiplexers 430 and 432 so that one of the two multiplexers may be activated, depending upon the input address for the data to be stored, in either the memory array 438 or 510. If the central processing unit or one of the other devices on the local bus requests a memory read operation to be performed, the address from which the data is to be read, is supplied to the port 72 through the destination receiver 602 to the port multiplexers 430 and 432 which cause one of the memory arrays 438 or 510 to output data either on the bus 530 or the bus 540. Data from the bus 530 is fed to an output data latch 630 connected thereto. Data from the bus 540 is connected to an output data latch 640. Data and check bits from the output data latches 630 and 640 is supplied via a pair of output buses 656 and 650 respectively to an error correction code corrector 652. The ECC corrector 652 has an output bus 654 which is connected to a plurality of data write back buffers for single bit error correction and byte/halfword write operations. The output data on bus 656 is fed to a byte alignment mechanism 658 connected thereto. If the output data is 8 or 16 bits long rather than 32 bits, the empty fields are packed with zeros to generate a 32 bit number which is the fed to an output bus 660. The output bus 660 has a data driver 662 connected thereto. An output data bus 664 is connected between the data driver 662 and the port 72 to transmit data from the memory array 438 and 510 to the port 72 and ultimately to the local bus 26. The destination address is supplied by the row address strobe, column address strobe port multiplexers on bus 614 to which is connected a return address latch 680 which holds the data signal. A destination latch 682 is connected to the return address latch 680 to supply the destination address via a bus 684 to a destination driver 686. A destination bus 688 supplies the destination address from the driver 686 to the port 72. A tag generator 690 is connected thereto. A tag bus 692 is also connected to the port 72. Thus, when a memory read operation is performed the data is supplied by the data driver 662 to the output address of the device to which the information is to be returned, such as the CPU 20 or any particular other device, such as an input/output processor. It is generated by the destination driver 686 and the necessary tag signals are generated by the tag driver 690. The tag driver 690, data driver 662 and destination driver 686 all operate under the control of the output control module 692, which is connected thereto.

It may be appreciated then, that the multiprocessing system provides a high speed method of sharing information between a plurality of processors. When information within a particular shared region of a local memory is updated in the local memory, it is simultaneously transmitted by a local write sense controller onto the reflective memory bus received by all other write sense controllers and stored at the corresponding shared addresses in their local memories by the read sense controllers. When it is necessary for a local processor to perform a memory access operation to read data from a shared portion of the data structure, a local memory is read from. All other local memories continue operating independently allowing all other local processors to continue on with their operations and completely eliminating contention and latency delays when information is read from the shared portion of a particular memory.

While there has been illustrated and described a particular embodiment of the present invention, it will be appreciated that numerous changes and modifications will occur to those skilled in the art and it is intended in the appended claims to cover all those changes which fall within the true spirit and scope of the present invention.

What is claimed and desired to be secured by Letters Patent is:

1. A data processing system, comprising:
    a data bus; and
    a plurality of nodes connected to the data bus, at least one of said plurality of nodes comprises:
    processor means for generating a data signal, an address signal and a memory write signal;
    a dual port memory unit having a first storage area for storing data local to a respective node and a second storage area for storing data shared between the plurality of nodes;
    a local bus connecting the processor means to a first port of the memory unit; and
    write sensing means connected to the data bus and also to the processing unit through the local bus, said write sensing means comprising:
    first comparator means for comparing address signals sensed from the local bus with a first predetermined value;
    second comparator means for comparing the address signals sensed from the local bus with a second predetermined value;
    first latch means for holding the data signals, address signals and write signals;
    first offset logic means for normalizing the address signal in response to the address signal being released from the first latch means;
    first request FIFO means for receiving data signals, and write signals from the first latch means, in response to receipt of a signal by the first latch means indicating that the address signal is of a value larger the first predetermined value, of a value smaller than the second predetermined value, and address signals from the first offset logic means;
    transmitter means for transmitting the sensed data signals, normalized address signals and memory write signals in order of receipt by the first request FIFO means;
    third comparator means for comparing address signals sensed from the data bus with a third predetermined value;
    fourth comparator means for comparing the address signals sensed from the data bus with a fourth predetermined value; and
    second offset logic means for offsetting the address signal to its original value upon a determination that the address signal is of a value larger than the third predetermined value and of a value smaller than the fourth predetermined value;
    the at least one of the processing nodes further comprising read sensing means connected between the write sensing means and a second port of the memory, unit, said read sensing means comprising:
    correction logic means for generating corrected signals for data sensed from the data bus by the write sensing means;
    second request FIFO means for receiving data signals, address signals and write sense signals from the write sense logic; and
    combining means for combining the correction signals with the data signals producing a corrected data signal to be delivered to the shared storage area of the memory unit.

2. A processing system as claimed in claim 1, wherein the read sensing means further comprises:
    alignment decoder means for determining the length of the data signal; and
    byte alignment means for adapting data of differing lengths for placement into the shared storage area of the memory unit.

3. A processing system as claimed in claim 2, wherein each of the plurality of processing nodes comprises processor means, a dual port memory unit, a local bus, read sense means and write sense means.

4. A data processing system, comprising:
    a data bus; and
    a plurality of nodes connected to the data bus, at least one of said plurality of nodes comprises:
    processor means for generating a data signal, an address signal and a memory write signal;
    a dual port memory unit having a first storage area for storing data local to a respective node and a second storage area for storing data shared between the plurality of nodes;
    a local bus connecting the processor means to a first port of the memory unit; and
    write sensing means connected to the data bus and also to the processing unit through the local bus, said write sensing means comprising:
    first comparator means for comparing address signals sensed from the local bus with a first predetermined value;
    second comparator means for comparing the address signals sensed from the local bus with a second predetermined value;
    first latch means for holding the data signals, address signals and write signals;

first offset logic means for normalizing the address signal in response to the address signal being released from the first latch means;

first request FIFO means for receiving data signals, and write signal from the first latch means, in response to receipt of a signal by the first latch means indicating that the address signal is of a value larger the first predetermined value, of a value smaller than the second predetermined value, and address signals from the first offset logic means;

transmitter means for transmitting the sensed data signals, normalized address signals and memory write signals in order of receipt by the first request FIFO means;

third comparator means for comparing address signals sensed from the data bus with a third predetermined value;

fourth comparator means for comparing the address signals sensed from the data bus with a fourth predetermined value; and second offset logic means for offsetting the address signal to its original value upon a determination that the address signal is of a value larger than the third predetermined value. and of a value smaller than the fourth predetermined value.

5. A data processing system, as claimed in claim 4 wherein at least one of said plurality of nodes comprises:

processor means for generating a data signal, an address signal and a memory write signal;

a dual port memory unit having a first storage area for storing data local to a respective node and a second storage area for storing data shared between the plurality of nodes;

a local bus connecting the processor means to a first port of the memory unit; and read sensing means connected between the write sensing means and a second port of the memory unit, said read sensing means comprising:

correction logic means for generating corrected signals for data sensed from the data bus by the write sense means;

second request FIFO means for receiving data signals, address signals and write sense signals from the write sense logic; and combining means for combining the correction signals with the data signals producing a corrected data signal to be delivered to the shared storage area of the memory unit.

6. Processing system as claimed in claim 5, wherein the read sensing means further comprises:

alignment decoder means for determining the length of the data signal; and byte alignment means for adapting data of differing lengths for placement into the shared storage area of the memory unit.

7. A processing system as claimed in claim 6, wherein each of the plurality of processing nodes comprises processing means, a dual port memory unit, a local bus, read sense means and write sense means.

* * * * *